Aug. 8, 1944. J. R. GOMERSALL 2,355,153
ELECTRIC TOASTER
Filed Sept. 13, 1941 2 Sheets-Sheet 1
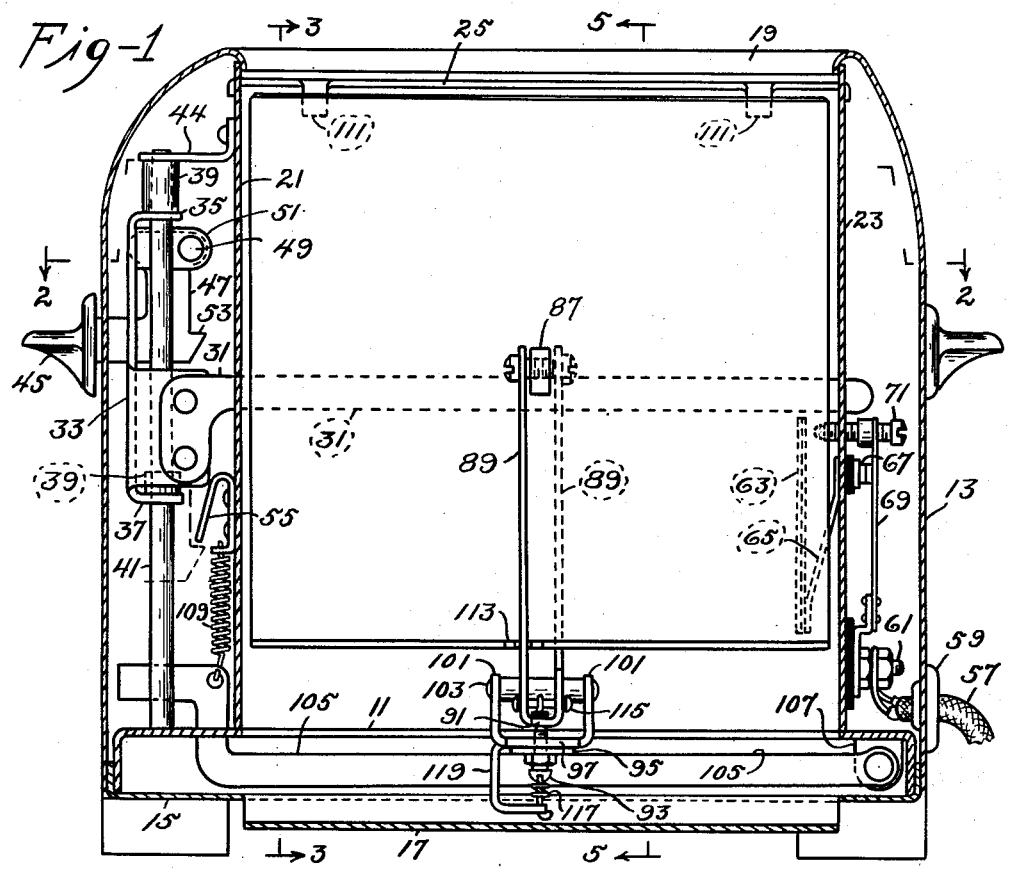
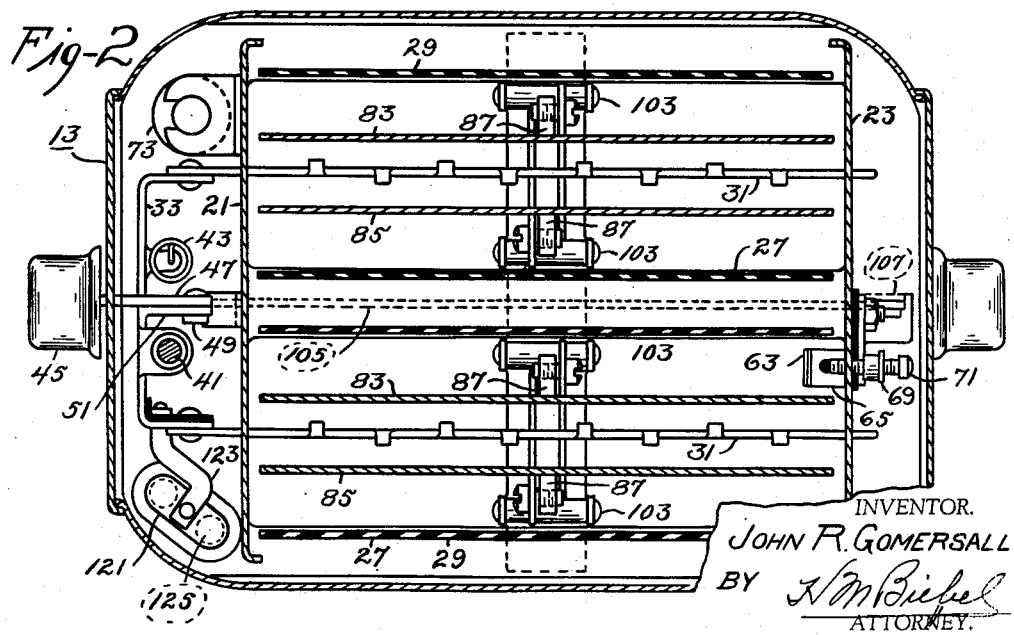
INVENTOR.
JOHN R. GOMERSALL
BY
ATTORNEY.

Aug. 8, 1944.　　　J. R. GOMERSALL　　　2,355,153
ELECTRIC TOASTER
Filed Sept. 13, 1941　　　2 Sheets-Sheet 2
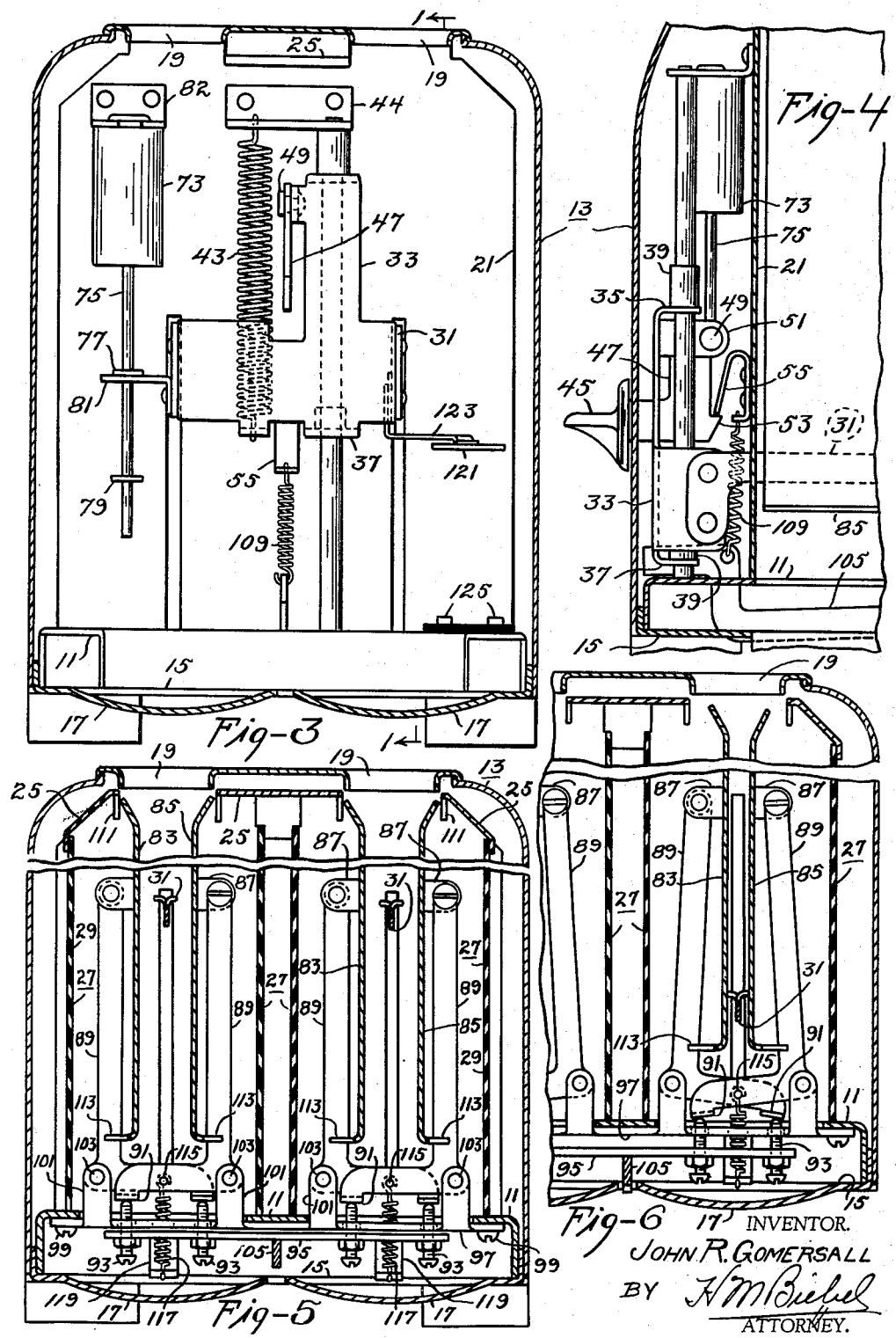
INVENTOR.
JOHN R. GOMERSALL
BY
ATTORNEY.

Patented Aug. 8, 1944

2,355,153

UNITED STATES PATENT OFFICE 2,355,153

ELECTRIC TOASTER

John R. Gomersall, Elgin, Ill., assignor to Mc-Graw Electric Company, Elgin, Ill., a corporation of Delaware Application September 13, 1941, Serial No. 410,683

6 Claims. (Cl. 219—19)

My invention relates to electric cooking devices and particularly to electric toasters.

An object of my invention is to provide a relatively simple, inexpensive and easily constructed and assembled toaster operative for its intended use.

Another object of my invention is to provide an electrically heated toaster for toasting slices of bread by heat conducted to them by sheet metal plates heated by electrically generated radiant heat.

Another object of my invention is to provide an electrically heated toaster for toasting thin slices of bread throughout their entire thickness by heat conducted to them by thin metal plates heated by electrically generated radiant heat while held in substantially flat condition by said metal plates.

Other objects of my invention will either be apparent from a description of one form of device embodying my invention or will be pointed out in the course of such description and set forth in the appended claims.

In the drawings,

Figure 1 is a longitudinal vertical sectional view through an electric toaster taken on the line 1—1 of Fig. 3, Fig. 2 is a horizontal sectional view taken on the line 2—2 of Fig. 1, Fig. 3 is a view in vertical lateral section on the line 3—3 of Fig. 1 and an elevational front view of the mechanism in the mechanism chamber, with the parts shown in non-toasting position, Fig. 4 is a fragmentary view in vertical longitudinal section taken on the line 1—1 of Fig. 3, the parts being shown in toasting position, Fig. 5 is a vertical lateral sectional view taken on the line 5—5 of Fig. 1, with the parts shown in non-toasting position, and, Fig. 6 is a fragmentary view similar to Fig. 5 except that the parts are shown in toasting position.

My invention is shown as having been applied to a two-slice toaster of more or less standard design, which toaster assembly includes a sheet metal bottom plate 11 and a casing 13 operatively associated therewith in any suitable or desired manner. I provide also a bottom closure member and crumb tray 15 which may be provided with pressed-out portions 17 (see Fig. 3) to provide openings for air to pass vertically upwardly through the toaster. The outer casing 13 may be of any suitable or desired construction and since it forms no part of my present invention, is described generally only. The upper or top portion of the casing 13 is provided with two openings 19 through which fresh slices of bread may be moved into the toasting chambers and through which the toasted slices of bread may be removed when properly toasted.

I provide a front intermediate wall 21 and a rear intermediate wall 23 which may have interfitting engagement at their lower edges with the bottom plate 11 and which may have secured thereto end portions of a top frame plate 25, in any suitable or desired manner. The bottom plate 11 and the top frame plate 25 are provided with ventilating apertures as will be noted by reference to Fig. 3, the apertures in the top frame plate 25 being in register with the bread receiving openings 19.

I provide further pairs of planar vertically extending fixed electric heating elements 27 each including one or more thin plates 29 of electric insulating material such as mica, having located thereon a resistor strand of wire (not shown in the drawings), all in a manner now well known in the art. These heating elements may be held at their top and their bottom edges by any means now well known in the art and since this holding means forms no part of my present invention, it is not shown in detail.

A bread carrier 31 extending substantially horizontally between each pair of spaced vertical heating elements has front and rear portions extending through the front and the rear intermediate wall so that the two carriers, in a two-slice toaster, may be moved vertically upwardly into the position shown in Fig. 1 of the drawings which is their non-toasting position, and into their lower position as shown in Fig. 4 which is their toasting position. The front end portions of the pair of carriers 31 are rigidly secured to a carriage plate 33 which, as shown more particularly in Fig. 2 of the drawings, may be of channel shape in lateral section, and may have an upper laterally bent portion 35 and a lower laterally bent portion 37 each having secured thereto a bushing or bearing 39, which bearing is adapted to move on a vertical standard 41 so that upward and downward movement of the carriage will result in upward and downward movement of the bread carrier and of a slice or slices of bread on the carrier.

The carrier or carriers are biased to their non-toasting position by a coil spring 43, the lower end of which is secured to the member 33 while the upper end is secured to a bracket 44 mounted on the front intermediate wall 21. Means for causing movement of said carriage and the carriers secured thereto in a downwardly direction may include an actuating knob 45 which is mounted on a lever arm 47 of generally bell crank shape pivotally secured to carriage plate 33 as by a rivet 49 fitted into a rearwardly extending lug or extension 51 secured to or from a part of carriage 33. The member 47 is provided with a hook-shaped lower end 53 which is adapted to engage with a detent 55 secured to the front intermediate wall 21 at a point so that when hook portion 53 is moved to below detent 55, as shown in Fig. 1 of the drawings, the carriers and the carriage will be held in their lowermost or toasting positions. It is obvious that release of the carriers and the carriage and quick upward movement under the influence of the coil spring 43 may be effected by manually raising the knob 45 to cause outward movement of the hook portion 53 away from the latch 55.

I provide a twin conductor cord 57 extending through a bushing 59 of electric-insulating material in the rear wall of the outer casing 13, the two conductor cords being connected to a pair of terminals 61, all in a manner well known in the art.

My improved toaster is provided with temperature control means including more particularly a bimetal bar 63 extending vertically of one of the toasting chambers and supported by a metal bar 65 which is in turn supported by the rear intermediate wall 23. A switch including a fixed contact 67 insulatedly mounted on the rear intermediate wall 23 and a contact arm 69 also insulatedly supported by the rear intermediate wall 23 are connected in series electric circuit with the electric toast heating elements hereinbefore described and when these heating elements are energized, the bimetal bar 63 will, at a certain adjustable temperature in the toasting chamber, move in a clockwise direction as seen in Fig. 1 of the drawings, to engage an adjustable contact screw 71 mounted on contact arm 69 to cause movement of this contact arm away from the fixed contact member 67 to thereby interrupt the energization of the toast heating element. The contact arm 69 is biased so that normally the contact 71 is in engagement with fixed contact 67.

Since it is desired to cause quick upward movement of the carrier and the carriage at the end of a toasting operation immediately subsequent to manual release of the latch 53 from the detent 55, the spring 43 may be relatively strong and in order to effect quiet stopping of the carriage 33, I may provide a dash-pot means including a cylinder 73 having a piston therein secured to a piston rod 75, which piston rod has stop members 77 and 79 thereon at a proper distance apart to be engaged by a projection 81 on carriage 33, particularly when the carriage 33 moves upwardly. The cylinder 73 may be supported by a bracket 82 secured to the front intermediate wall 21.

Each toasting chamber, defined more particularly by the spaced pairs of vertically extending heating elements, has positioned therein a pair of relatively thin sheet metal plates 83 and 85. Each of these plates has a laterally extending lug 87 thereon and outwardly thereof, that is, each lug 87 on its sheet metal plate extends away from its cooperating metal plate, as will be noticed particularly in Figs. 5 and 6 of the drawings. Each metal plate is pivotally supported by a lever arm 89 of substantially bell crank shape, the arm connected to the individual sheet metal plates being long while the horizontally extending arm of each bell crank lever 89 is relatively short and is provided with a laterally extending portion 91, for a purpose which will presently appear.

Each pair of plates 83 and 85 are normally maintained in spaced apart positions relatively to each other, this being effected by means of short machine screws 93 mounted on a cross bar 95 located below the bottom plate 11. Each screw 93 extends through an opening in a laterally extending plate 97 which is secured against the under surface of bottom plate 11 as by machine screws 99 (see Fig. 5). The plate 97 is provided with a plurality of pairs of upstanding projections or lugs 101 which are each adapted to receive a pivot pin 103, which pivot pin pivotally supports the bell crank lever 89. It will be noted that the short arms of the bell crank levers 89 extend toward each other so that they will, in effect, overlap each other.

Means are provided for exerting a biasing yielding pressure on the bar 95 in an upward direction and this means includes a relatively long pivotally mounted arm 105, the pivotal mounting being at the rear end of the toaster as from a bracket 107, as shown in Fig. 1 of the drawings. The front end portion of arm 105 is bent upwardly through the bottom plate 11 and a short coil spring 109 has its lower end secured to the upwardly projecting portion of arm 105, while its upper end is secured to detent member 55, all as shown in Fig. 1 of the drawings. The action of spring 109 in tending to cause turning movement of arm 105 in a clockwise direction as seen in Fig. 1 causes a bias of cross bar 95, of screws 93 and of the outer ends of the short arms of bell crank levers 89 in such direction that the plates 83 and 85 will be normally yieldingly held away from each other. The top frame plate 25 has a pair of depending lugs 111 secured thereto adjacent the front and the rear end portions which lugs are adapted to be engaged by the outwardly bent upper end portions of the metal plates 83 and 85. The lower end portions of the respective plates 83 and 85 have each a laterally bent portion 113 at substantially the middle of their length, which portion may be of substantially slotted or Y-shape to engage the lower end portion of the long arm of bell crank lever 89 whereby a three-point stop means for the metal plates is normally provided.

The mid portion of each of the lower, short and horizontally extending arms of bell crank levers 89 have mounted therein a short cross bar 115 to which is connected the upper end of a short coil spring 117, the lower end of which is connected to a depending lug or projection 119 on plate 97 so that, when permitted, spring 119 will tend to draw downwardly the pin 115 and therefore cause approaching movement of the plates 83 and 85 toward each other. It will be noted that this approaching movement of the plates 83 and 85 will occur when an operator presses downwardly on actuating knob 45 at the start of a toasting operation and after a slice of bread has been placed on the carrier while the carrier is still in its upper position, this downward movement of knob 45 continuing until the latch shoulder 53 is in position below the detent 55, as shown in Fig. 4 of the drawings. This causes downward movement or turning movement of arm 105 in a counter-clockwise direction whereby the screws 93 are moved downwardly permitting springs 119 to cause downward movement of pins 115 and therefore effect approaching movement of plates 83 and 85 toward each other and against the two large-area surfaces of slices of bread resting upon the respective carriers 31.

Means for causing simultaneous energization of the toast heating elements may include a contact bridging member 121 mounted on a projection 123 insulatedly supported on carriage plate 33, which contact bridging member is adapted to engage a pair of fixed contact members 125 insulatedly supported on the bottom plate 11 at its upper surface.

If an operator desires to start toasting of a pair of slices of bread, he will place them upon the carriers 31 while these carriers are still in their uppermost or non-toasting position, as shown particularly in Fig. 5 of the drawings, and will then press downwardly on the knob 45 to move the carriers into their lower or toasting position, as shown particularly in Fig. 6 of the drawings. During the last or lowermost part of the downward movement of carriage plate 33, it will engage the front end portion of arm 105 to move the same downwardly, as hereinbefore described, with resultant approaching movement of each pair of spaced plates 83 and 85 until these plates have been moved into engagement with the respective side surfaces of a slice of bread to be toasted. It will be evident, further, that the structure hereinbefore described for supporting the thin metal plates contacting a slice of bread to be heat treated or toasted, will cause the contacting engagement to be made with a uniform pressure over the entire surface of the contacting surface of the metal plate and of the piece or slice of bread.

It will further be evident that the metal plates are heated by radiant heat electrically generated in the toast heating elements. It is further evident that the radiant heat is transformed into conducted heat and applied in such manner to the outside surface of a slice of bread and the provision of a thermostatic control means has the result that the temperature to which the outside surface of a slice of bread is subjected is relatively much lower than that of the radiant electrically generated heat and I prefer to maintain this temperature at a substantially constant value, which value may vary between the approximate range of 350° F. to 450° F.

It may further be pointed out here that the provision of metal plates will subject a slice of bread to much more uniform heat than if the slice of bread were subjected to intermittently effective radiant heat as would be the case if a thermostat were utilized to limit the temperature in the toasting chamber to which the surface of a slice of bread were subject in case no sheet metal plates were provided. It is, of course, obvious that as soon as the heating elements were deenergized by a thermostatic control switch, the temperature of the radiant heat would drop very rapidly, but this is not the case when a metal plate is provided to transform the radiant heat into conducted heat, as applied to a slice of bread, since the metal plates will have some thermal mass and store some even though a relatively small quantity of heat. I may also blacken that surface of each of the metal plates receiving the radiant heat to ensure improved reception of the radiant heat.

My improved toaster is particularly adapted for making the so-called "Melba" toast and I prefer to use it on relatively thin slices of bread, substantially of one-half the thickness of a normal slice of bread and the radiantly heated plates are very effective in maintaining the relatively thin slices of bread and the resultant thin slice of toast in flat condition, whereby a relatively pleasing finished slice of Melba toast is obtained.

I wish to point out further that the improved structure embodying my invention as hereinbefore described, is effective to toast a slice of bread to substantially the same degree of brownness throughout its entire thickness, which is not the case in the ordinary toaster and method of toasting where a slice of bread is subjected to high temperature radiant heat and a nicely browned slice of toasted bread is found to be browned or toasted on only its outer and relatively thin portion. I attribute this to the method used in my improved toaster in that an electrically generated radiant heat of relatively high temperature is transformed into heat of much lower temperature, which heat is applied to and conducted to the outside surface of a relatively thin slice of bread and this operation can be continued until the slice of bread has been toasted or browned to substantially the same degree throughout its entire thickness.

Various modifications may be made in the structure illustrated and described herein and all such modifications clearly coming within the scope of the appended claims are to be considered as being covered thereby.

I claim as my invention:

1. A toaster comprising a pair of spaced fixed electric heating elements, a pair of flat metal plates between and substantially parallel to said heating elements, means normally yieldingly holding said plates spaced apart, a bread carrier located between said plates movable therebetween into toasting and non-toasting positions and normally yieldingly biased into non-toasting position, means to move said carrier to its toasting position and means operatively engageable by said carrier near the end of its movement into toasting position to cause said plates to move toward each other to clamp therebetween a slice of bread on the carrier.

2. A toaster comprising a pair of spaced planar vertically extending fixed electric heating elements, a pair of flat metal plates located between and substantially parallel to said heating elements, means tending to move said metal plates toward each other, spring means normally yieldingly holding said plates apart, a bread carrier between said plates movable into toasting and non-toasting positions relatively to the heating elements and normally yieldingly biased into non-toasting position, means to cause movement of the carrier into toasting position and means mechanically operatively engageable by said carrier near the end of its movement into toasting position to cause said plates to move toward each other to clamp therebetween a slice of bread on the carrier and cause toasting thereof by heat received by the plates by radiation from the heating elements and conducted to the surfaces of a slice of bread.

3. A toaster comprising a pair of spaced planar fixed electric heating elements, a pair of relatively thin flat metal plates spaced from each other between said heating elements, a pair of pivotally supported lever arms each pivotally supporting one of said metal plates, spring means operatively engaging said pair of lever arms and tending to move said plates toward each other, means including a spring biased lever arm engaging said spring means to normally hold said metal plates apart and manually actuable means adapted to engage said spring biased lever arm and move the same to cause said spring means to move said plates toward each other into clamping engagement with a slice of bread to be toasted.

4. An electric toaster comprising a pair of planar vertically-extending electric toast heating elements held in stationary spaced positions relatively to each other, a pair of relatively thin flat metal plates extending substantially parallel to and between said toast heating elements and adapted to move toward and away from each other, a bread carrier reciprocally vertically movable to an upper non-toasting position and to a lower toasting position and normally yieldingly biased into its upper position, means to move said bread carrier into its lower position and means including two spring-actuated members for causing said metal plates to move toward each other and be held in bread clamping position when the bread carrier is moved into its lower position with a slice of bread thereon and to move away from each other to cause release of the slice of bread and its upward movement by the bread carrier when the latter moves into its upper position.

5. An electric toaster comprising a pair of spaced planar electric toast heating elements, a pair of relatively thin flat metal plates between said toast heating elements adapted to move toward and away from each other, a pair of pivotally supported lever arms respectively pivotally supporting said flat metal plates, spring means tending to cause said plates to move toward each other into clamping engagement with a slice of bread therebetween, a spring biased lever arm normally counteracting the tendency of said spring means, a bread carrier between said plates movable into toasting and non-toasting positions and effective to operatively engage said spring biased lever arm when moved into toasting position and to cause a slice of bread on the carrier to be tightly clamped between said metal plates and to cause said metal plates to be moved away from each other to release the slice of bread when the bread carrier begins its movement to non-toasting position.

6. A toaster comprising a pair of spaced stationary planar electric toast heating elements, a pair of relatively thin flat metal plates between said toast heating elements and adapted to move toward and away from each other, two opposed pivotally supported bell crank levers, each pivotally supporting one of the metal plates on one of its arms, spring means connected to both the other arms of said bell crank levers adapted to cause movement of said metal plates toward each other, an arm pivotally supported at one of its ends and having its intermediate portion adapted to operatively engage the other arms of said bell crank levers, a spring connected to the other end of the pivotally supported arm to normally overcome the effect of said spring means and cause said flat metal plates to be held in spaced-apart positions, a bread carrier between the metal plates reciprocally movable into toasting and non-toasting positions and yieldingly biased into non-toasting position and means to cause movement of the bread carrier into toasting position and to engage the other end of said pivotally supported arm and move it to effect approaching movement of said flat metal plates toward each other into clamping engagement with a slice of bread on the carrier.

JOHN R. GOMERSALL.